United States Patent
Mahmoud et al.

(10) Patent No.: US 7,219,257 B1
(45) Date of Patent: May 15, 2007

(54) METHOD FOR BOOT RECOVERY

(75) Inventors: Fadi A. Mahmoud, Livermore, CA (US); Ganapathy S. Sridaran, Milpitas, CA (US)

(73) Assignee: Adaptec, Inc., Milpitas, CA (US)

( * ) Notice: Subject to any disclaimer, the term of this patent is extended or adjusted under 35 U.S.C. 154(b) by 525 days.

(21) Appl. No.: 10/608,312

(22) Filed: Jun. 27, 2003

(51) Int. Cl.
*G06F 11/00* (2006.01)

(52) U.S. Cl. .......................................... 714/6

(58) Field of Classification Search ............... 714/6, 714/36; 713/1, 2
See application file for complete search history.

(56) References Cited

U.S. PATENT DOCUMENTS

| | | | |
|---|---|---|---|
| 5,307,497 A * | 4/1994 | Feigenbaum et al. ......... 713/1 |
| 5,325,532 A * | 6/1994 | Crosswy et al. ............... 713/2 |
| 5,418,918 A * | 5/1995 | Vander Kamp et al. ........ 713/2 |
| 5,694,600 A * | 12/1997 | Khenson et al. ............... 713/2 |
| 5,933,631 A * | 8/1999 | Mealey et al. ................. 713/2 |
| 6,041,395 A * | 3/2000 | Beelitz ......................... 711/173 |
| 6,088,794 A * | 7/2000 | Yoon et al. ..................... 713/2 |
| 6,175,904 B1 * | 1/2001 | Gunderson ................. 711/162 |
| 6,182,187 B1 * | 1/2001 | Cox et al. ...................... 711/5 |
| 6,195,695 B1 * | 2/2001 | Cheston et al. .............. 709/221 |
| 6,289,449 B1 * | 9/2001 | Aguilar et al. ................. 713/2 |
| 6,347,371 B1 * | 2/2002 | Beelitz et al. ................. 713/2 |
| 6,421,792 B1 * | 7/2002 | Cromer et al. ............... 714/36 |
| 6,581,143 B2 * | 6/2003 | Gagne et al. ............... 711/162 |
| 6,658,563 B1 * | 12/2003 | Ice et al. ........................ 713/2 |
| 6,701,385 B1 * | 3/2004 | Young ........................... 710/5 |
| 6,711,660 B1 * | 3/2004 | Milne et al. ................. 711/173 |
| 6,748,553 B2 * | 6/2004 | McBride et al. ............. 714/15 |
| 6,779,130 B2 * | 8/2004 | Sprunt et al. .................. 714/6 |
| 6,862,681 B2 * | 3/2005 | Cheston et al. ................ 713/2 |
| 6,901,493 B1 * | 5/2005 | Maffezzoni ................. 711/162 |
| 6,963,951 B2 * | 11/2005 | Ng et al. ..................... 711/112 |
| 2002/0083367 A1 * | 6/2002 | McBride et al. ............. 714/15 |
| 2002/0087555 A1 * | 7/2002 | Murata ........................ 707/10 |
| 2004/0153733 A1 * | 8/2004 | Lin ................................ 714/6 |

* cited by examiner

*Primary Examiner*—Robert Beausoliel
*Assistant Examiner*—Amine Riad
(74) *Attorney, Agent, or Firm*—Martine Penilla & Gencarella, LLP (57) ABSTRACT

A method for recovering boot-up data in a computer system is provided. The method includes storing boot up data in a first container that is accessible by an operating system and copying the boot up data from the first container to a second container that is inaccessible by the operating system. If boot up using the boot up data from the first container fails, the method further includes copying the boot up data from the second container to the first container and booting up the computer system using the boot up data copied into the first container from the second container.

15 Claims, 9 Drawing Sheets

METHOD FOR BOOT RECOVERY

BACKGROUND OF THE INVENTION

1. Field of the Invention

This invention relates generally to computing technology and more particularly concerns the booting up of a computing device.

2. Description of the Related Art

In a typical computer system, a computing device typically includes a central processing unit (CPU) on a motherboard that may communicate with peripheral devices such as, for example, storage devices, to retrieve and store data. When the computing device is typically turned on, a process generally known as a boot-up occurs. During this process, a system BIOS that is run by the CPU may communicate with the storage device to retrieve programming instructions to enable the operation of the computing device. In a typical boot-up process, the system BIOS retrieves data from a master boot record portion of the storage device. The master boot record generally contains pointers that indicate where system files are located in the storage device. The system files are data that enable the system BIOS to load an operating system into the system memory and enable the CPU to run the operating system. Therefore, the system BIOS first looks to the master boot record to determine the location of the system files and once the system files are found, they are loaded into the system memory for execution by the CPU.

Figure 1:
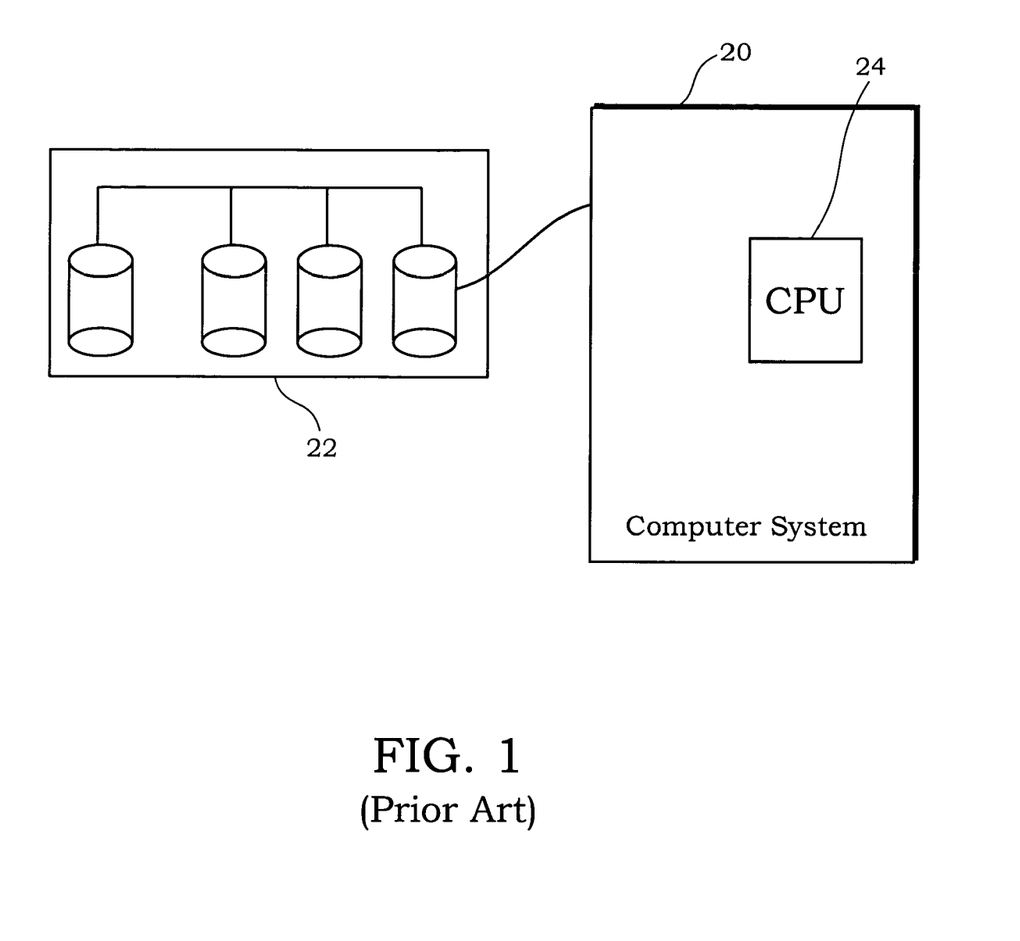
FIG. 1 shows a typical computer system connected with a storage device.

FIG. 1 shows a typical computer system 20 connected to a storage device 22. Generally, during a boot up process, a system BIOS that is run by a CPU 24 of the computer system 20 initializes peripheral devices that are connected to the computer system. The system BIOS then accesses a master boot record of a storage device which is typically a hard disk drive. The master boot record is generally the first sector of the storage device and contains pointers to locations where the system files are located. The BIOS accesses the master boot record and starts to load the system files into the system memory. Boot up then continues as is known to those skilled in the art.

Protection of data on the storage device has been sought by using devices such as redundant array of inexpensive disks (RAID). In such systems, redundant data may be stored on multiple disks so, in cases of a disk failure, the same data may be retrieved from another disk and therefore, the data is not lost. This type of protection may work if a particular disk drive fails but if a virus or some other type of unintended data altering entity is introduced into the RAID system, the virus may be stored on all of the disk drives and therefore redundant data systems may not protect the data on the disk drives. This type of issue is especially problematic where boot up data is desired to be protected. Even in RAID systems, when a master boot record or system files are infected, the computing device may not be able to boot up due to the infection. Consequently, the computer system may not be able to boot up if the boot up data is corrupted or is lost because even the redundant data stored in the RAID arrays may contain the same problems as the boot up data in the master boot record and the original system files. This can occur because the operating system typically has access to all the storage devices in a RAID array. Therefore, because the operating system has access to all locations where the boot up data exists, if a virus attack occurs, the RAID arrays with the boot up data may not be protected.

Unfortunately, in situations where data integrity of boot-up data is desired, there is a need for a data storage system that enables protection of the master boot record data and system files data.

SUMMARY OF THE INVENTION

As can be seen, there is a need for a way for boot up data to be copied, protected, and accessed in such a way that the copied boot up data is not infected or altered by software altering agents such as, for example, viruses. Therefore, in circumstances where the boot up data is infected or altered in such a way that boot up cannot be accomplished, the copies of boot up data may then be used to boot up the computing device. This would permit uninfected and unaltered boot up data to be accessed by the computing device in a seamless and powerful manner. Several inventive embodiments of the present invention are described below.

A method for recovering boot-up data in a computer system is provided. The method includes storing boot up data in a first container that is accessible by an operating system and copying the boot up data from the first container to a second container that is inaccessible by the operating system. If boot up using the boot up data from the first container fails, the method further includes copying the boot up data from the second container to the first container and booting up the computer system using the boot up data copied into the first container from the second container.

In another embodiment, a method for recovering boot up data generating a first logical storage unit is provided. The method includes generating a first logical storage unit, the first logical storage unit being configured to be accessible by an operating system and generating a second logical storage unit, the second logical storage unit being configured to be inaccessible by the operating system. The method also includes storing boot up data in the first logical storage unit, and copying the boot up data from the first logical storage unit to the second logical storage unit.

In yet another embodiment, a method for recovering boot-up data is provided. The method includes generating a first container in a storage system where the first container is inaccessible to the operating system. The method also includes generating a second container in the storage system and copying boot up data from the second container to the first container. When input requesting boot recovery is received the method further includes setting a recovery bit and by copying boot up data from the first container to a master boot record location and a system file location within a second container where the first container is inaccessible to an operating system. When the input requesting boot recovery is received, the method also includes booting up using the copied boot up data in the first container and unsetting the recovery bit.

The present boot recovery system is advantageous in a number of different ways. Boot recovery as described herein enables safe boot up of a computer system using copied system data when the system data normally used is corrupted or cannot be accessed. Specifically, a separate container different from the boot up container is generated which can contain copies of the system data such as, for example, MBR and system files. The separate container may be managed by a host card so the operating system does not generally have access to the copied system data. This way, the copied system data may be advantageously kept in a container that is segregated from agents such as viruses that may use the operating system to proliferate throughout the devices managed by the operating system. In such a fashion, when problems do occur with the system data, the protected system data may be recovered and written into the locations where the problematic MBR and/or the system files were located in the boot up container. Such use enables optimal boot recovery of the computer system with minimum downtime and damage to the computing system.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention is described for a method and device for boot-up data to be copied, protected, and accessed in such a way that the copied boot-up data is not infected or altered by software altering agents such as, for example, viruses. Therefore, in circumstances where the boot-up data is infected or altered in such a way that boot-up cannot be accomplished, the copied boot-up data in a hidden container may then be used to boot-up the computing device. This would permit uninfected and unaltered boot-up data to be accessed by the computing device in a seamless and powerful manner. It will be obvious, however, to one skilled in the art, that the present invention may be practiced without some or all of these specific details. In other instances, well known process operations have not been described in detail in order not to unnecessarily obscure the present invention.

In general terms, the apparatus and method of the present invention enables generation of a hidden logical storage container (hidden to the operating system) within a particular portion of a storage space within one or more storage device(s). In one embodiment, as indicated below, the hidden logical storage container may be known as an operating system secure sector (OSSS). The master boot record and system files may be located in a non-hidden logical storage container (not hidden to the operating system). In one embodiment of the present invention, the master boot record and the system files in a non-hidden container may be copied into the hidden container (e.g., the OSSS). Because the OSSS is a hidden container, the copied MBR and the system files may be protected from viruses, Trojan horses, and the like which may use the operating system to infect or corrupt file(s) such as, for example, boot up data. In one embodiment, if the MBR and the system files in the non-hidden container become corrupted, the pristine MBR and the system files in the OSSS may be retrieved and copied into the non-hidden container thereby enabling boot-up processes to occur.

Figure 2:
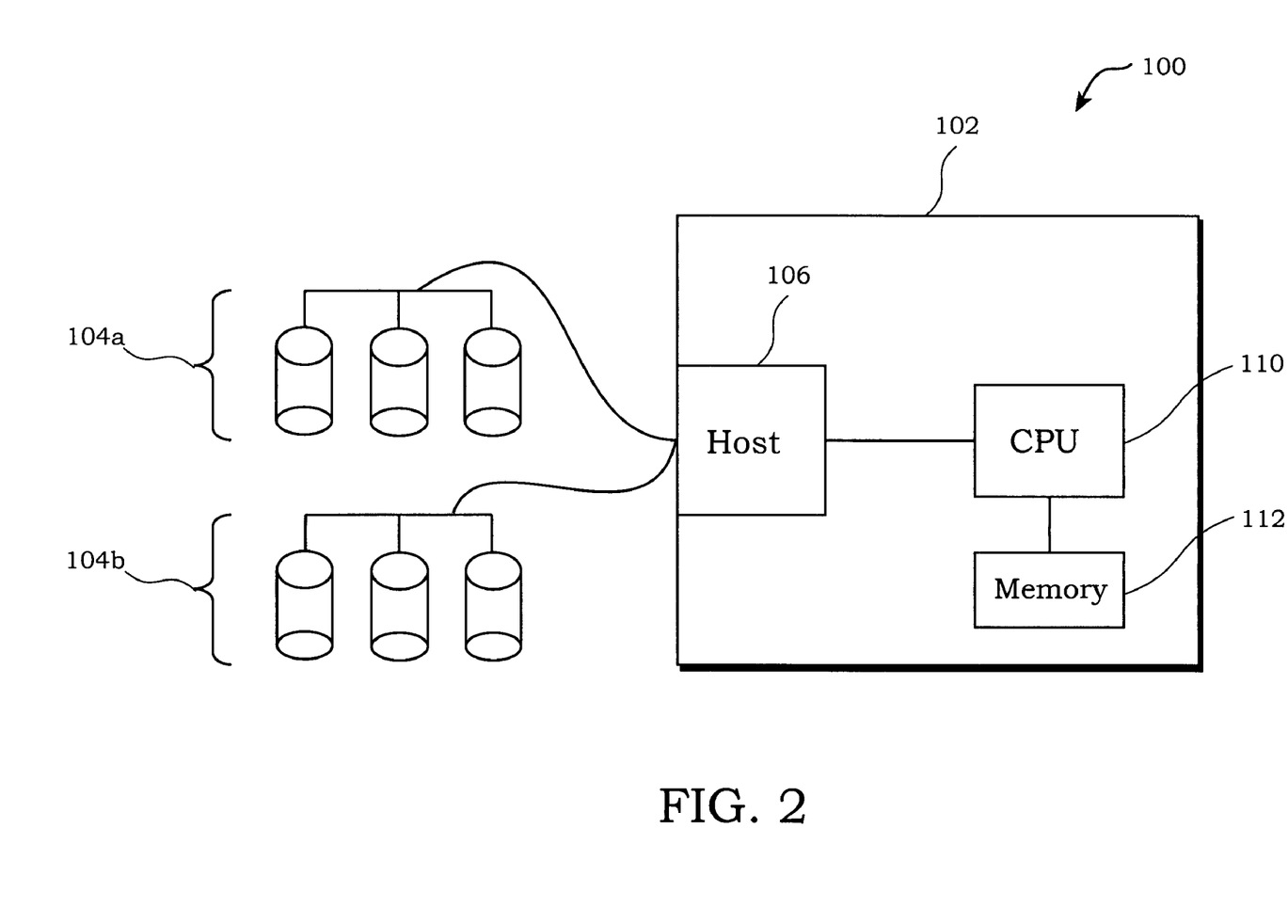
FIG. 2 shows a block diagram of a computer system in accordance with one embodiment of the present invention.

FIG. 2 shows a block diagram 100 of a computer system 102 in accordance with one embodiment of the present invention. In one embodiment, the computer system 102 includes a computer processing unit (CPU) 110 that is connected to a system memory 112 and a host adapter 106. The host adapter 106 is attached to any suitable number and types of peripheral devices such as, in one embodiment, storage devices 104. In a preferable embodiment, the storage devices 104 may include a redundant array of inexpensive drives (RAID) 104a and 104b.

In one embodiment, the storage devices 104 may include data enabling the computer system 102 to boot-up. It should be appreciated that one skilled in the art would understand a typical boot-up process of a computer system. In one embodiment, the computer system 102 utilizes a master boot record of the storage devices 104 to load system files of the operating system to be run by the CPU 110. The master boot record contains pointers to the location of the system files for use in the boot-up of the operating system.

In one embodiment, the CPU 110 begins to start executing a BIOS boot program which may be located in system memory space FFFF0h. It should be appreciated that depending on the configuration of the system memory and the system BIOS, the BIOS boot program may be loaded in any suitable portion of the system memory. The BIOS looks for peripheral devices connected to the computer system 102. The BIOS then looks for other devices' ROMs to see if any of them have BIOSes. In one embodiment, the CPU may find an Option ROM BIOS (as discussed in reference to FIG. 3) and execute the programming of the Option ROM BIOS. The BIOS proceeds to detect all of the peripheral devices on the system and runs the BIOS for each of the perhipheral devices.

After detecting the peripheral devices and conducting the processes typically accomplished in a boot-up process, the BIOS begins the search for a drive to boot from. Once the BIOS has identified the boot drive, the BIOS looks for boot data to start the operating system boot process. In one embodiment, the boot drive is a hard disk so the BIOS finds a master boot record, which in one embodiment, is located at the first sector on the hard drive. If it finds what it is looking for, the BIOS starts the process of booting the operating system, using the information in the boot sector. At this point, the code in the boot sector takes over from the BIOS and boot-up is completed.

The master boot record (MBR) is the location from which the BIOS can load the program that starts the loading of the operating system. The MBR in one embodiment is located at the first sector on the disk. Using the pointers in the MBR, the BIOS determines where the system files are so the operating system may be loaded.

Figure 4A:
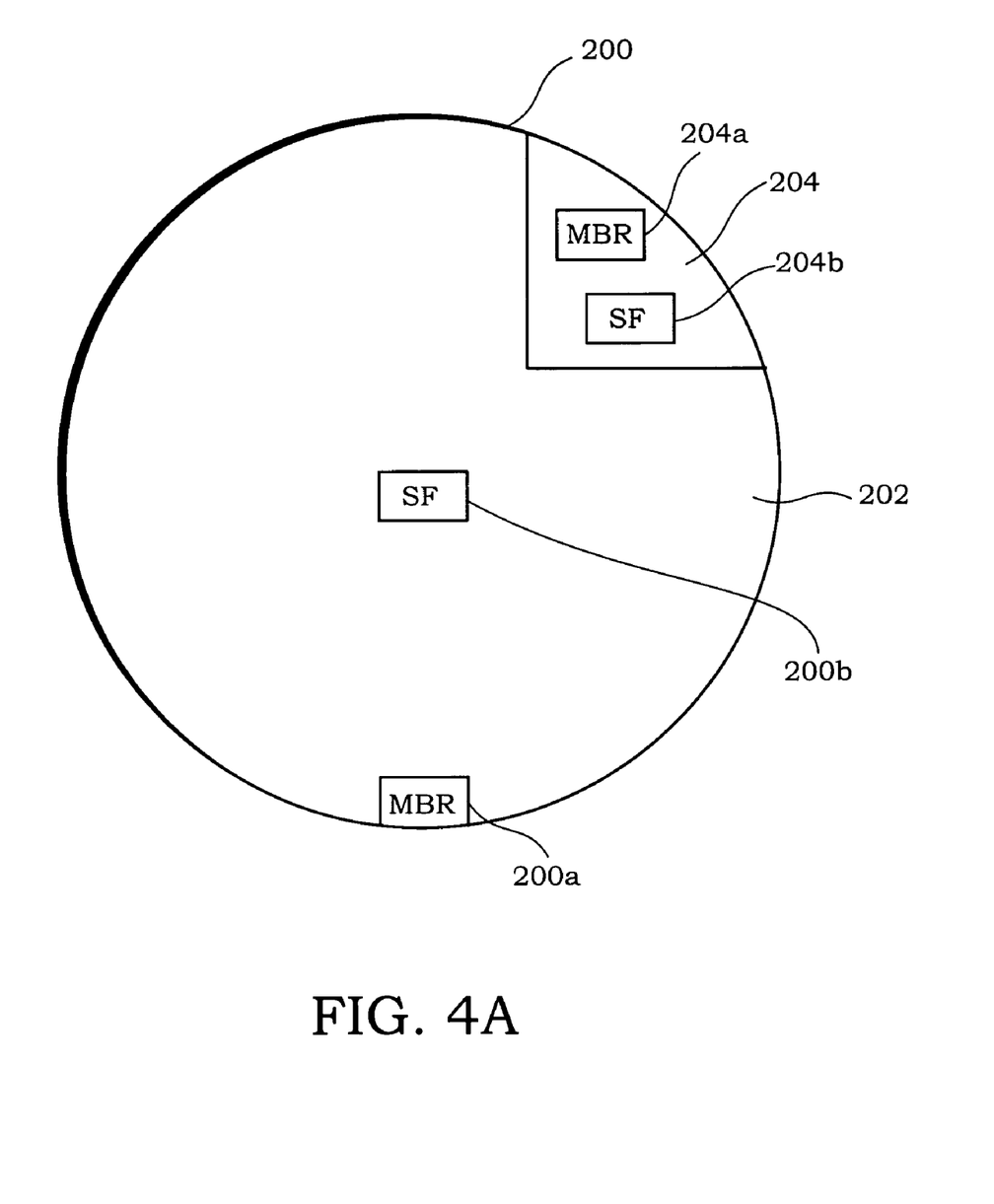
FIG. 4A shows a hard disk with an OSSS in accordance with one embodiment of the present invention.

In one embodiment, the disk drive may contain an operating system secure sector (OSSS) that may be hidden to the operating system. The OSSS may be any suitable logical or physical container on the computer system that may be hidden from the operating system. In one embodiment, the OSSS may be a portion of the hard disk drive that is hidden to the operating system. Therefore, for example, the OSSS may be a disk partition that is hidden to the OS. The OSSS may contain a copy of the MBR and a copy of the system files used for booting up and loading the operating system. The OSSS is described in further detail in reference to FIG. 4. In cases of corruption of the MBR and the system files in a non-OSSS portion of the logical or physical container, the protected MBR and the protected system files in the OSSS may be retrieved and accessed to boot up the computer system 102.

In one embodiment, the OSSS may be generated by a code in software or hardware called the container configuration utility (CCU). In one embodiment, the CCU is in the firmware of a host adapter card that generates a first container and at least one other container. The container configuration utility may be any code in software or hardware that can generate the first container and at least another container where one of the containers is hidden from the OS. In one embodiment, one of the containers may be the OSSS that is not directly accessible by the operating system and the other container(s) may be configured to be accessible by the operating system and the system BIOS. Therefore, the computing system can boot from the container(s) that is visible to the system BIOS and the operating system once loaded. Therefore, in one embodiment, one container is only accessible by the firmware individually or the firmware through the use of a firmware configuration utility such as, for example, SMPro™. Therefore, by making one of the containers unknown to the system BIOS and the operating system, the contents of the "hidden" container may be kept protected. Therefore, by storing a copy of uncorrupted boot up data within the "hidden" container (or protected storage container), if the boot up data in the visible container(s) (or boot up container) is corrupted or altered, the uncorrupted boot up data may be recovered into the visible container(s) and used for a boot up process. As discussed more extensively below, the containers may be logical containers or physical containers. It should be appreciated that boot up data may be any suitable type of data that may be utilized for booting up a computer such as, for example, MBR data and/or system data/files.

It should be understood that although the preserving of the MBR data and the system files are described for exemplary purposes, any suitable type of data used for boot up may be preserved, hidden, and recovered by the apparatus and methods of the present invention. Therefore, the apparatus and methods described herein is extremely flexible, powerful, and may be used by any suitable type of BIOSes and operating systems. In addition, the computer system described herein may be any suitable configuration such as a PC, a storage area network, a server based computer network, etc. In another exemplary computer system, at least one server may be connected to at least one storage device over a network and the boot up data that may be stored on the at least one storage device may be preserved and recovered by the at least one storage device.

Figure 3:
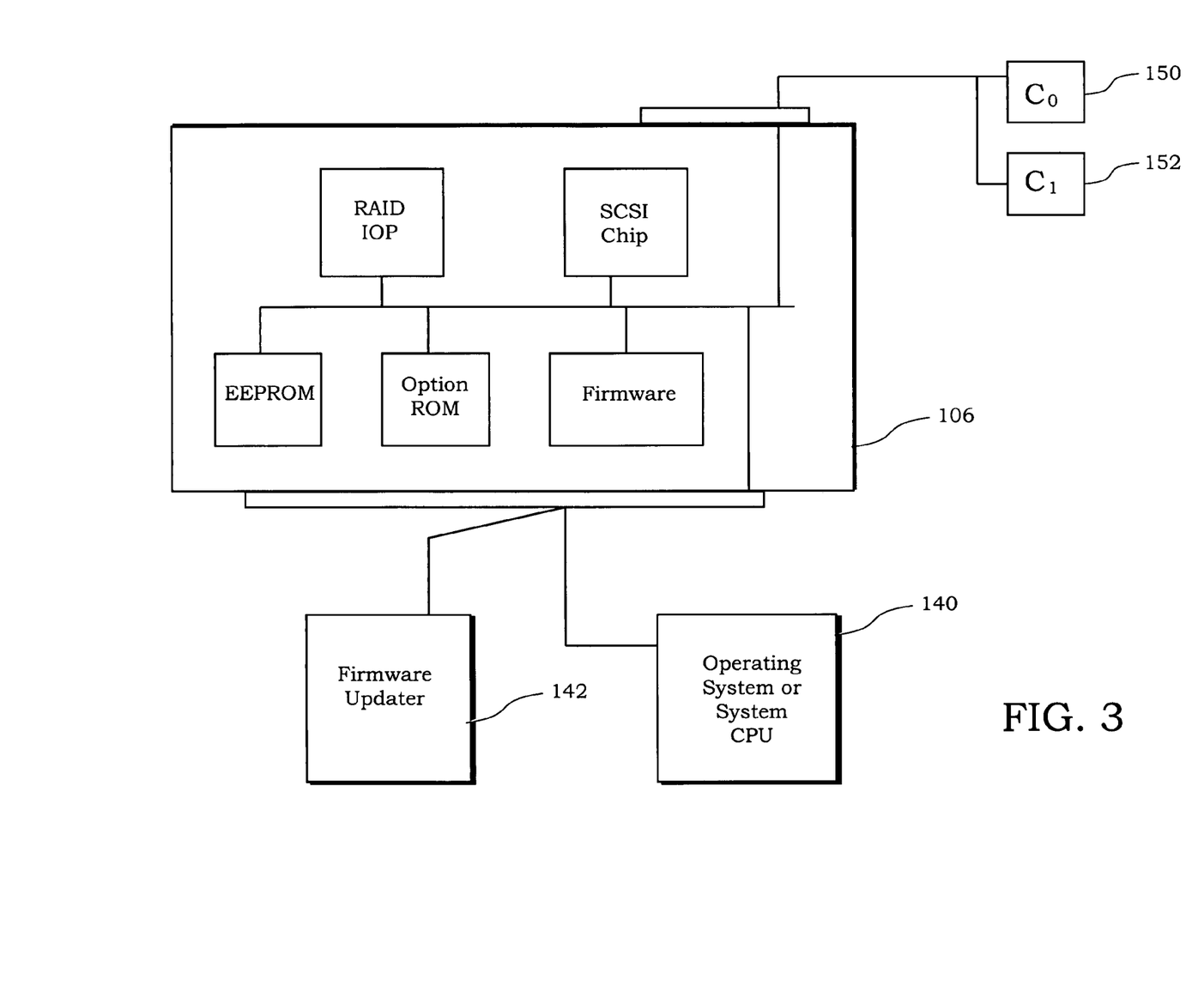
FIG. 3 illustrates a host adapter capable of managing multiple containers in accordance with one embodiment of the present invention.

FIG. 3 illustrates a host adapter 106 capable of managing multiple containers in accordance with one embodiment of the present invention. The host adapter 106 may be any suitable device that may assist the computer system to manage devices connected to the computer system. In one embodiment, the host 106 may be a SCSI card that can manage SCSI devices. In another embodiment, the host 106 may be a RAID card that can help manage RAID devices.

In one embodiment, the host adapter 106 may communicate with the operating system 140 and a firmware updater 142 that are being run by the CPU 110. It should be appreciated that the firmware updater 142 may be any suitable type of software or hardware that may enable updating of data within the firmware. In one embodiment, the firmware updater 142 may be code such as, for example, SMPro™. The host adapter 106 can also communicate with containers 150 and 152. It should be appreciated that the containers 150 and 152 may be logical storage units or physical storage units. Logical storage can encompass and include any suitable number and type of physical storage units. Therefore, in one exemplary embodiment, a logical storage unit can include one or more disk drives that can be contained in one or more RAID arrays. In another exemplary embodiment, logical storage units can include one portion of a disk drive and another portion of a different disk drive. In one embodiment the container C0 150 is a partition with a disk drive that contains the MBR and system files normally accessed in a boot-up process. In such an embodiment, the container C-1 152 may represent the OSSS that contains the MBR and the system files that may be utilized to boot up when the MBR and system files or any other suitable type of boot up data in the container C-0 150 are corrupted or cannot be utilized for boot up processes.

The host adapter 106 may contain any suitable type of computing component as long as the OSSS may be managed and updated as described herein. In one embodiment, the host adapter 106 may include a RAID IOP, SCSI chip, EEPROM, Option ROM, and firmware. It should be appreciated that depending on the host adapter 106 utilized, any suitable type of hardware may be utilized to enable management of a peripheral device connected to the host adapter 106.

FIG. 4A shows a hard disk 200 with an OSSS 202 in accordance with one embodiment of the present invention. In one embodiment, the hard disk 200 has an MBR 200a which may be accessed by the system BIOS during boot-up. The MBR 200a may include pointers showing the location (s) of system files 200b that the BIOS may utilize to load the operating system and complete the boot-up process.

When the MBR 200a and/or the system files 200b have any type of problems which prevent the proper boot-up of the computer system, a user may enable the accessing of the OSSS 202 so the MBR 204a and the system files 204b may be accessed and retrieved to complete the boot-up process.

Figure 4B:
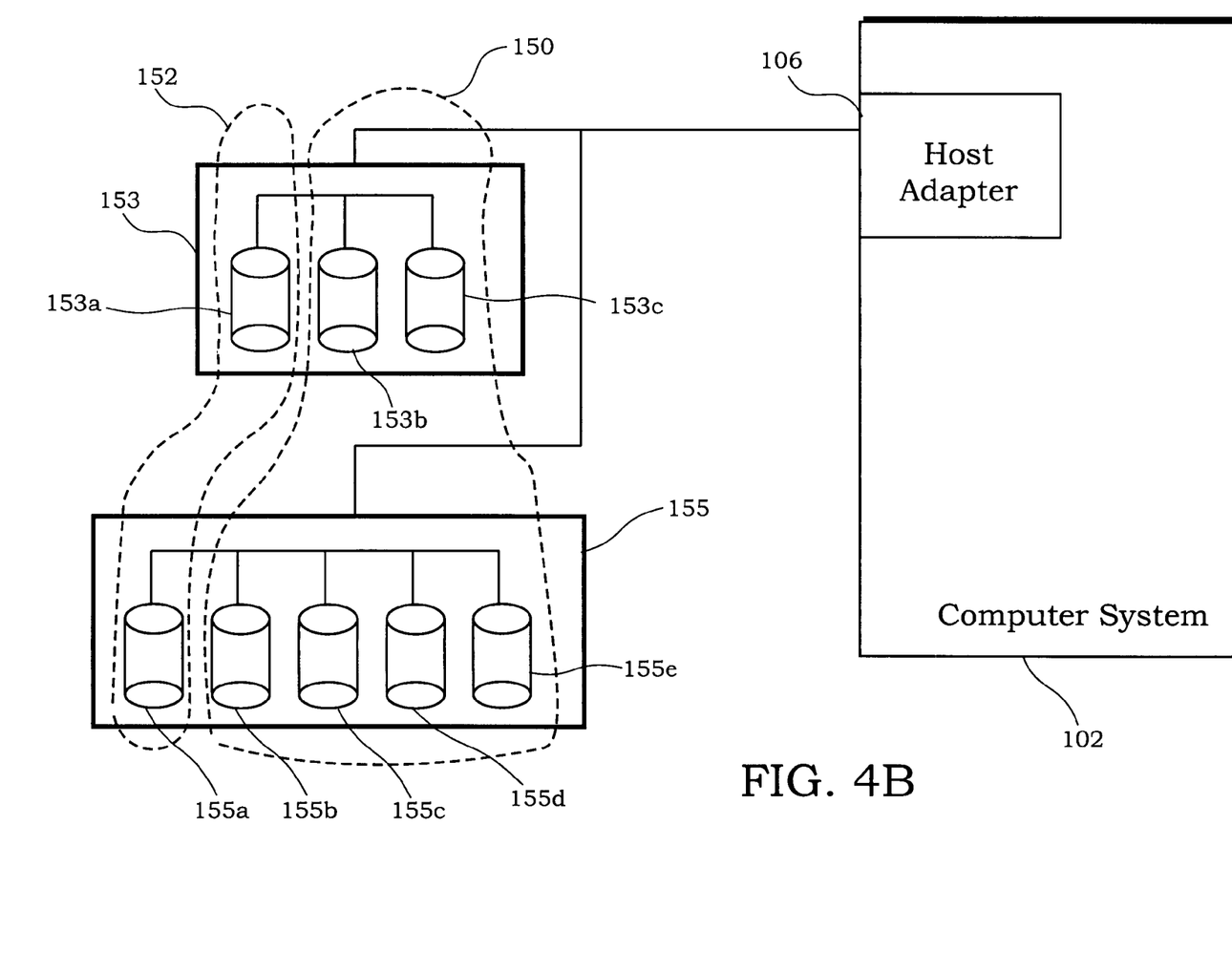
FIG. 4B shows storage containers in accordance with one embodiment of the present invention.

As discussed previously, the first container and second container may be logical storage units. In the embodiment shown by FIG. 4A, the first container and second containers are physical storage areas on one disk drive. In another embodiment, the first container may be located in one disk drive and the second container may be located in another disk drive. In yet another embodiment as shown in FIG. 4B, the first container may be located in a first RAID array and the second container may be located in the first RAID array or a second RAID array. Also, as indicated previously, any suitable number of containers may be utilized where the MBR data and the system files may be located across one or more physical storage locations.

FIG. 4B shows storage containers 150 and 152 in accordance with one embodiment of the present invention. It should be appreciated that the containers 150 and 152 may each include any suitable number and types of physical storage units or portions of any suitable physical storage units. The containers 150 and 152 may be logical containers that include portions of a RAID array 153 and a RAID array 155. In one embodiment, the container 150 includes a disk drive 153a of the RAID array 153 and a disk drive 155a of the RAID array 155. The containers 150 and 152 are shown by the broken lines surrounding the disk drives included in the logical containers. In such a configuration, the disk drives 153a and 155a may be treated as one logical storage unit (or a container) by the host adapter, and the disk drives 153b, 153c, 155b, 155c, 155d, and 155e may be treated as another logical storage unit (or container) by the host adapter. Therefore, in one embodiment, the container 152 may include multiple disk drives encompassing more than one RAID arrays 153 and 155 while the container 150 may also include multiple disk drives encompassing more than RAID arrays 153 and 155. It should be appreciated by those skilled in the art that other types of similar configurations may be utilized so the containers 150 and 152 may include one or more of any suitable type of storage devices. It should also be appreciated that although two containers are shown that more than one container may be managed by the host adapter as long as one of the containers may be the OSSS.

Figure 5:
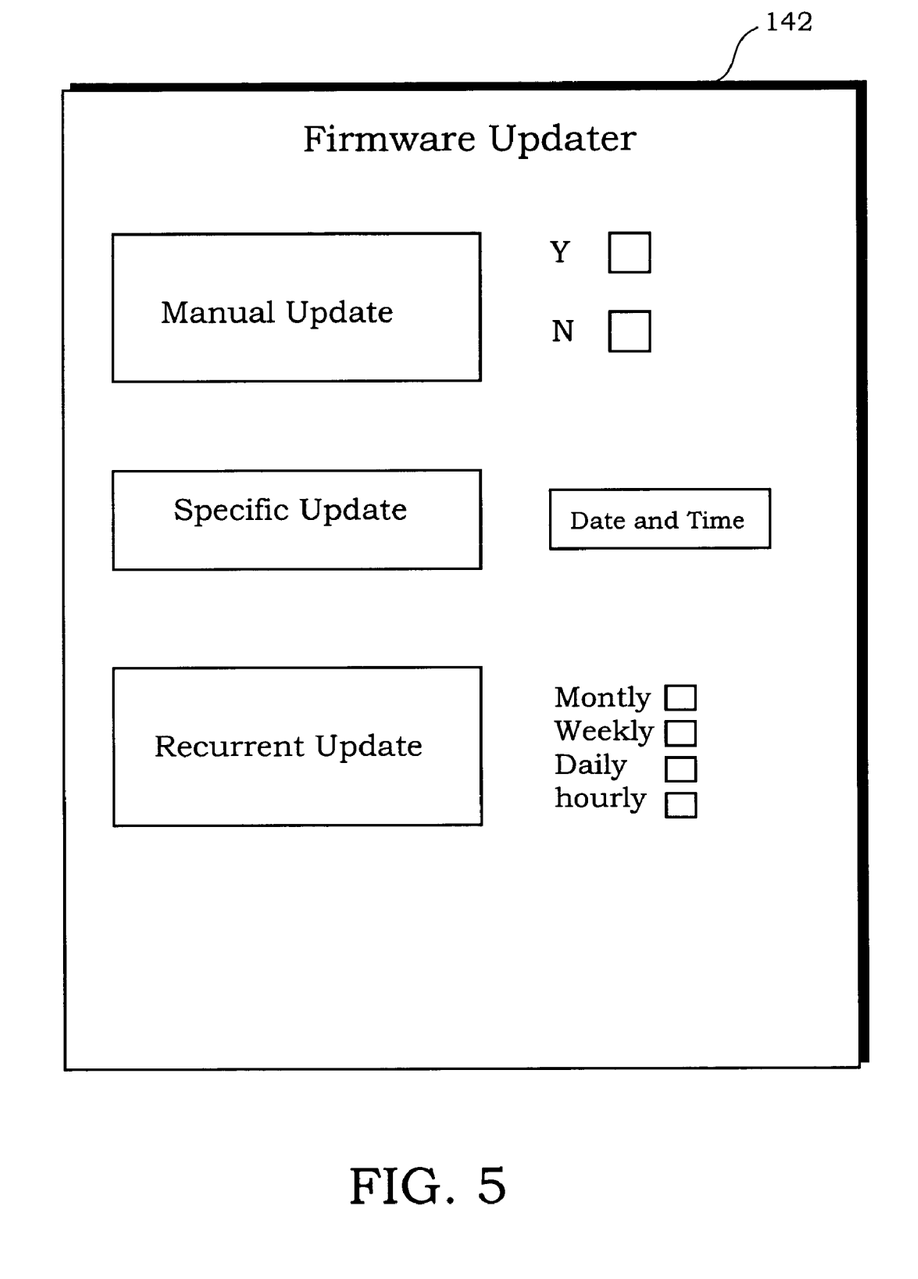
FIG. 5 illustrates a firmware updater in accordance with one embodiment of the present invention.

FIG. 5 illustrates a firmware updater 142 in accordance with one embodiment of the present invention. The firmware updater 142 may be software or hardware with code that enables a user to update boot data in the OSSS with the boot data in the storage device(s) that is normally used for boot up. In one embodiment, the firmware updater 142 may update the MBR 202a and the system files 202b with the data of MBR 200a and system files 200b. This type of updating may enable a user to keep the MBR 202a and system files 202b current so in cases of difficulty using the MBR 200a and system files 200b, the MBR 202a and the system files 202b can be used to boot-up with the current system settings.

It should be appreciated that the firmware updater 142 may be utilized to set up any suitable frequency of updating MBR 202a and system files 202b such as, for example, manual updating, specific updating, and recurrent updating. In one embodiment, the user may utilize manual updating where upon command by a user, the firmware updater can access the firmware of the host adapter 106 to update the MBR 202a and the system files 202b in the OSSS 202 with the current MBR 200a and the system files 200b. In such an embodiment, the user would specifically command an updating of the OSSS 202.

In another embodiment, the user may set a specific date and time where the OSSS 202 may be updated. In one embodiment, the user can select the year, month, date, and time when the updating is to take place. The specific amount of time may be application dependent. It should also be understood that the updating may be safeguarded where the system may be configured to only allow the updating of the OSSS 202 after boot up data in the non-OSSS portion of the hard disk 200 is found to be problem free. Therefore, in such an embodiment, the updating of the OSSS 202 with the latest MBR and system file data may only occur when the system is safe. In this fashion, the OSSS 202 can nearly always be kept contaminant free and may almost always enable boot recovery. Again, although in this example, a single hard disk 200 is used in an exemplary embodiment, the OSSS 202 may include part or all of one or more physical storage devices or in another embodiment, part or all of one or more logical storage devices. In addition, the non-OSSS portions may also include part or all of one or more physical storage devices or in another embodiment, part or all of one or more logical storage devices.

In yet another embodiment, the user may set recurrent time intervals where the OSSS 202 may be updated. In such an embodiment, the user may have a choice of updating every second, minute, hour, day, week, month, year, etc. It should be appreciated that any suitable type of time interval may be utilized and also may be customized to suit the desires of a user. In one embodiment, when the updating occurs, the firmware updater may be configured or the BIOS may be configured so a warning is given to the user to confirm the desires to update the OSSS 202. Such a warning may be given to confirm that the MBR 200a and the system files 200b are virus free because updating the OSSS 202 when the MBR 200a and system files 200b when a virus infection exists would infect the OSSS 202. In another embodiment, the firmware updater may automatically run a virus checker before the updating is done to make sure that the MBR 200a and system files 200b are not infected before the OSSS 202 is updated. It should be appreciated that any suitable type of precaution may be taken so the OSSS 202 is not infected with a virus that may have infected the non recovery portion of the hard drive 200.

Figure 6:
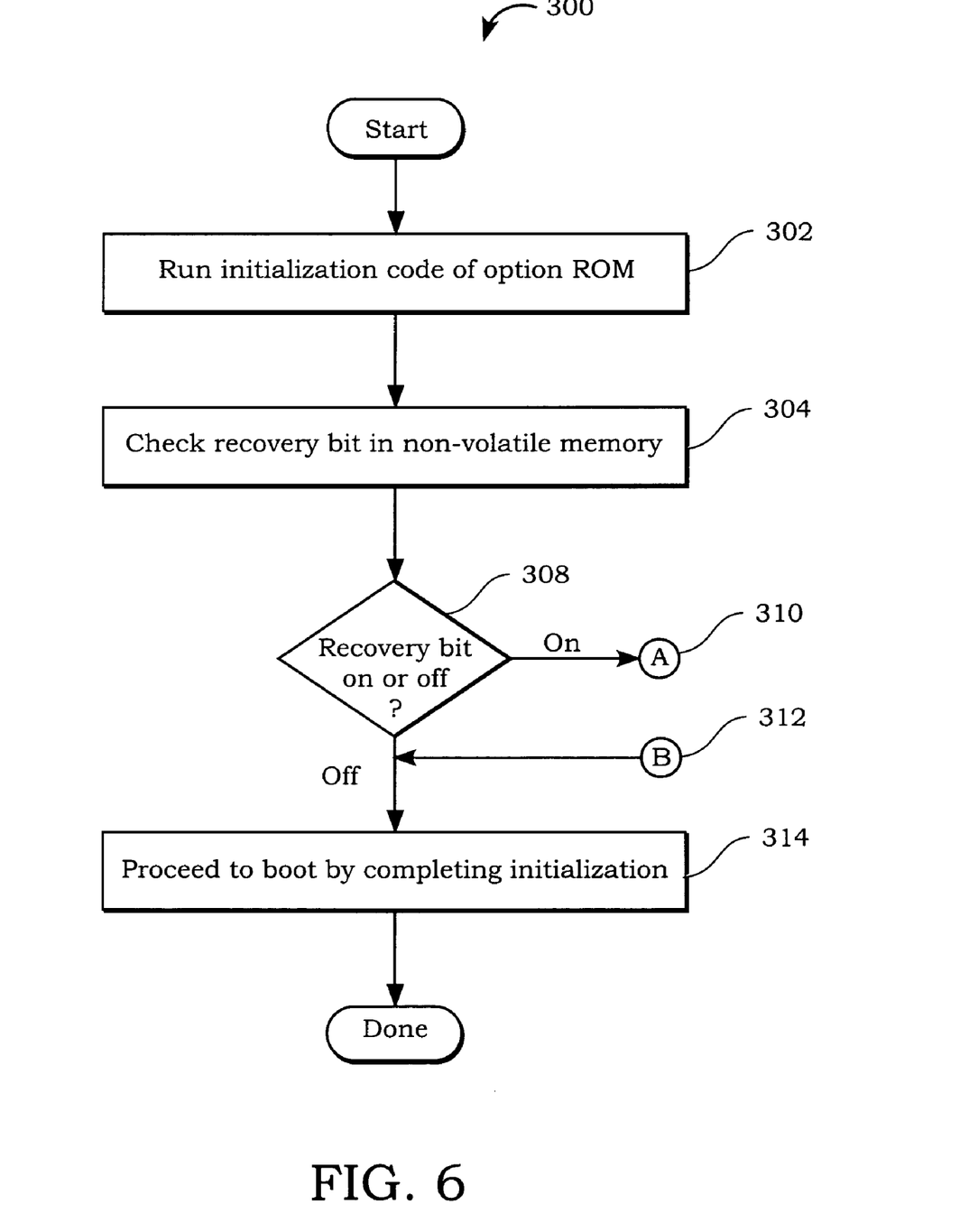
FIG. 6 shows a flowchart which defines a method of boot recovery in accordance with one embodiment of the present invention.

FIG. 6 shows a flowchart 300 which defines a method of boot recovery in accordance with one embodiment of the present invention. It should be understood that the processes depicted in the FIGS. 6, 7, and 8 may be in a program instruction form written on any type of computer readable media. For instance, the program instructions can be in the form of software code developed using any suitable type of programming language. For completeness, the process flow of FIGS. 6, 7, and 8 will illustrate an exemplary process whereby an OSSS is generated and recovery boot-up is conducted.

The method begins with operation 302 where an initialization code of option ROM is run. In this operation, the initialization code is loaded from the option ROM into the system memory and run by the CPU. For example, the initialization code may conduct the process of determining the configuration of a computer system such as what devices are connected to the computer system and what resources are required to run the devices.

After operation 302, the method proceeds to operation 304 where a recovery bit in a non-volatile memory is checked. It should be appreciated that the non-volatile memory may be any suitable type of memory that can retain data after power off such as, for example, EEPROM, flash memory, static RAM with battery backup, non-volatile RAM, and the like. In one embodiment, the non-volatile memory is an EEPROM that is located on a host adapter card. The recovery bit may be turned on or off depending on whether boot recovery is to be conducted as discussed in the next operation.

After operation 304 the method advances to operation 308 which determines whether the recovery bit is on or off. If the recovery bit is on then the method moves to operation A which initiates the flowchart discussed in FIG. 7 thus beginning recovery of the boot-up data. If the recovery bit is off then the method advances to operation 314 which continues to boot-up by completing initialization. The recovery bit may be turned on or off at power-up by bringing up a set up screen. The set-up screen can be brought up by pressing some keystroke or any other suitable type of input. At the set-up screen, a user can indicate that boot recovery is desired or not desired. If boot recovery is desired the recovery bit is turned on and if normal boot up is desired then the recovery bit is turned off.

After operation-A 310 is finished, operation-B 312 initiates operation 314 which proceeds to boot by completing initialization. When the flowchart as described in FIG. 7 is done, the method comes back to operation 314 to finish initialization after the boot-up data in the OSSS has been utilized to restore usable boot-up data in the boot-up storage container.

The computer system may then be rebooted after which the system BIOS accesses the MBR and boot up continues in a typical manner. This is made possible because the MBR and the system files are uncorrupted copies of the MBR and the system files that were formerly in the OSSS. Therefore, if, for example, a virus infection had taken place, the recovery methodology enables the placement of fresh and uncorrupted MBR and system files into the MBR and system file locations in the non-OSSS portion of the storage device (s) so boot-up may occur without problems.

Figure 7:
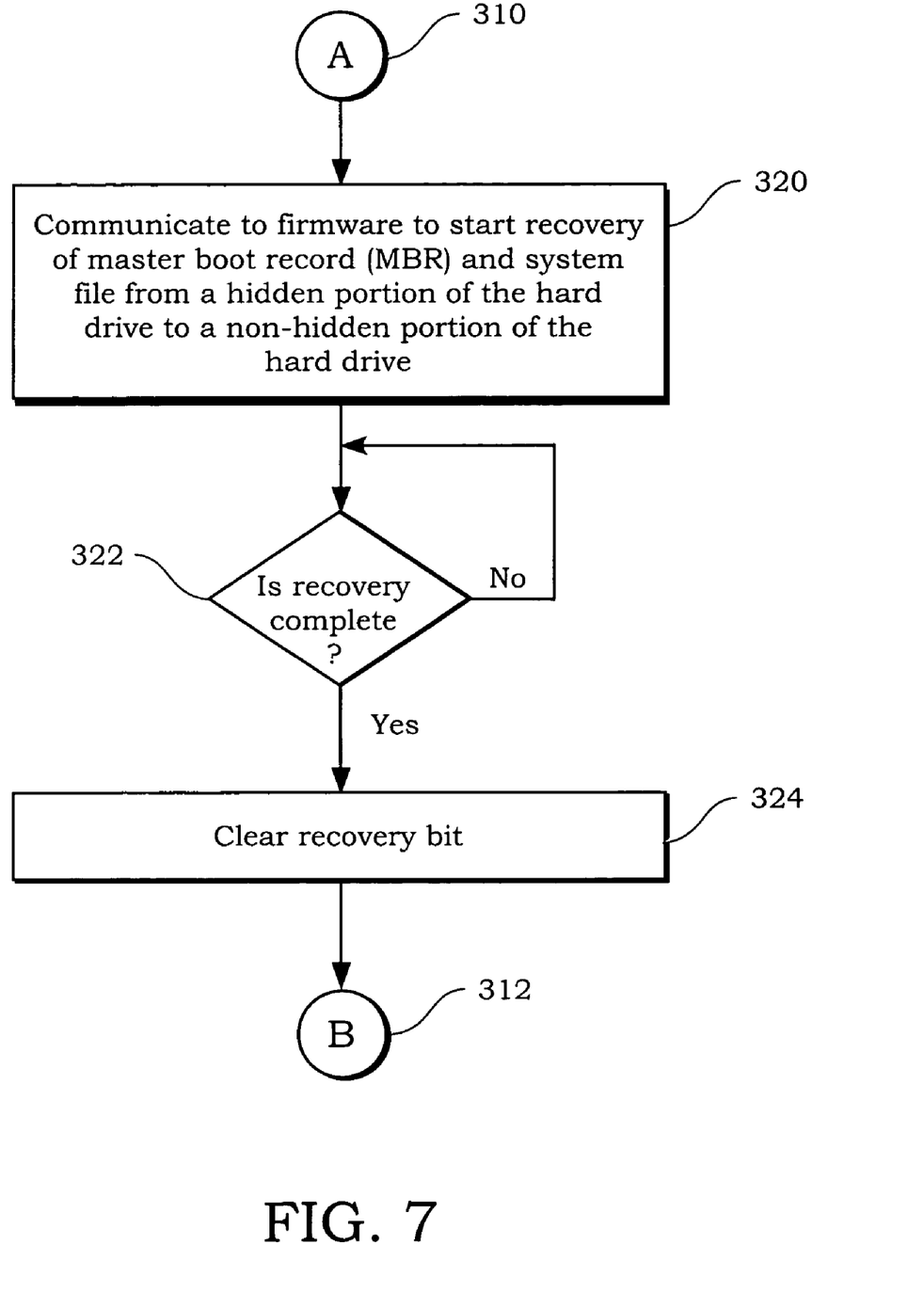
FIG. 7 illustrates a flowchart which defines boot recovery in accordance with one embodiment of the present invention.

FIG. 7 illustrates a flowchart which defines boot recovery in accordance with one embodiment of the present invention. The flowchart begins with operation 320 which communicates to firmware to start recovery of a master boot record (MBR) and system file(s) from a hidden portion (e.g., the OSSS 202) of the hard drive to a non-hidden portion of the hard drive. It should be appreciated that the communication to firmware to start boot recovery may be any suitable type of input such as, for example, a control-A keystroke.

The communication initiates the running of the firmware within the host adapter. The firmware may be any suitable code in software or hardware that may enable the recovery of the boot data (e.g., MBR, system files, etc.) from the OSSS. Therefore, the firmware is configured to retain the copied location of boot up data within the OSSS so that boot data may be recovered and the corrupted boot data may be replaced. Therefore, the operating system does not have knowledge of the location of the OSSS and the firmware may keep the OSSS segregated from other storage areas that are accessible to the OS.

After operation 320, the flowchart advances to operation 322 which determines if the boot recovery is complete. If the recovery is not complete, the flowchart returns to operation 322. Therefore, the method waits for the boot recovery (e.g., copying of the boot data from the OSSS to the non-hidden logical storage container) to be completed before the method continues. This ensures that the copying of the MBR from hidden portion of the boot disk to the non-hidden portion of the boot disk is finished. The boot recovery is complete if the boot data from the OSSS has been copied into the MBR and the system file locations of the non-hidden portion of the boot disk.

If the recovery is complete, the flowchart moves to operation 324 which clears the recovery bit. The recovery bit is cleared so that when the computer system is rebooted, the recovery of the boot data is not conducted again. Then the flowchart moves to operation B which returns to the method described in reference to FIG. 6.

Figure 8:
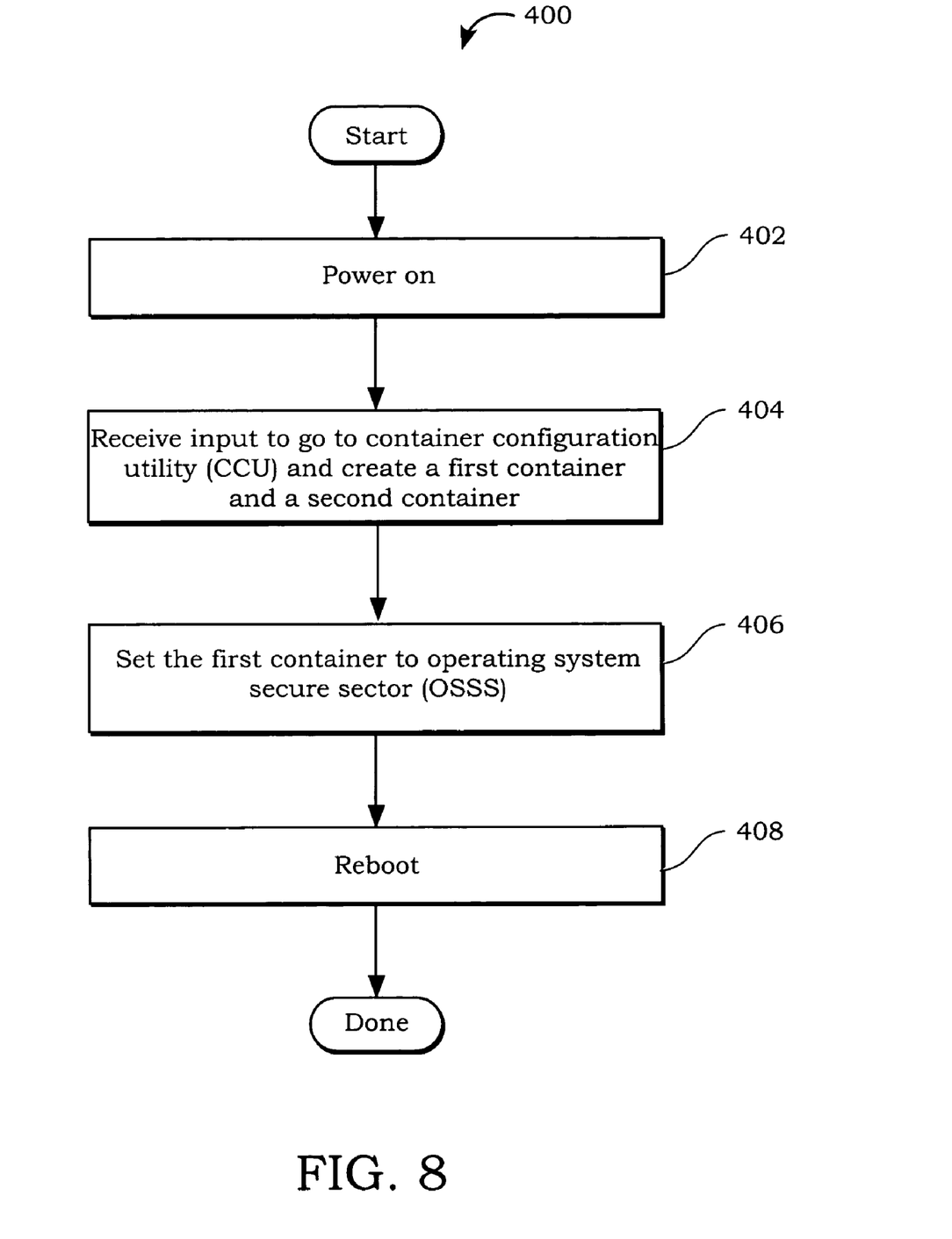
FIG. 8 illustrates a flowchart which defines the setting up of the operating system secure sector (OSSS) in accordance with one embodiment of the present invention.

FIG. 8 illustrates a flowchart 400 which defines the setting up of the operating system secure sector (OSSS) in accordance with one embodiment of the present invention. The flowchart 400 begins with operation 402 where the power is turned on in the computer system.

After operation 402, the flowchart proceeds to operation 404 which receives input to go to container configuration utility (CCU) and creates a first container and a second container. The container configuration utility may be any code in software or hardware that can generate the first container and the second container where one of the containers is hidden from the OS. In one embodiment, the CCU is at least a portion of the firmware in the host adapter 106. In one embodiment, the first container C0 is the OSSS and the second container C1 is the portion of the disk drive accessible by the operating system and the system BIOS. In one embodiment, the first container C0 is only accessible by the firmware individually or the firmware through the use of a firmware configuration utility such as, for example, SMPro™. Therefore, the first container and the second container are logical representations of different portions of the disk drive. In another embodiment, the first container and the second container may be individual containers that incorporate different disk drive portions of separate disk drives. In yet another embodiment, the first container and the second container may be different logical storage devices in a storage area network. In another embodiment, the first container and the second container may be different storage units in a RAID configuration. Therefore, any suitable number or type of storage devices may be used to generate the first container and the second container.

Then the flowchart advances to operation 406 which sets the first container to be the operating system secure sector (OSSS). It should be appreciated that the OSSS may be any suitable size and may include one or more portions of one or more disk drives depending on the configuration of the container desired. In one embodiment, the OSSS is just large enough to house a copy of the MBR and a copy of the system files. The OSSS may also be varied as the MBR and system files change in size. Therefore, the first container may be flexible to accommodate any suitable type of storage device and operating system configurations.

Therefore, in operation 406, the first container is set up and a copy of the MBR and the system files are copied from the second container into the first container (e.g., OSSS). After the MBR and the system files are in the first container, the computer system is protected against corruption of the MBR and the system files in the second container. Consequently, if the MBR and the system files in the second container becomes corrupted or has loss of data, the MBR and the system files in the first container provides boot protection.

After operation 406, the flowchart ends with operation 408 where the computer system is rebooted. Therefore, once the computer has been rebooted, the computer system has a copy of the MBR and the system files in the first container (e.g., the OSSS) with the original MBR and the system files located in the second container that is the portion of the storage container that is actually utilized in the boot-up operation. Consequently, if there are problems with files or data in the second container, the first container may be used as a source of clean MBR and system files. In one embodiment, the first container is not accessible by the operating system. This enables the data in the first container to be protected from data corruption or data corruptive activities that could use the operating system to damage data required for proper boot-up.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for recovering boot up data comprising:
    generating a first logical storage unit, the first logical storage unit being configured to be accessible by an operating system;
    generating a second logical storage unit, the second logical storage unit being configured to be inaccessible by the operating system;
    storing boot up data in the first logical storage unit;
    copying the boot up data from the first logical storage unit to the second logical storage unit;
    setting a recovery bit in a nonvolatile memory of a host adapter to initiate boot recovery; and
    when the recovery bit is set,
    copying the boot up data from the second logical storage unit to boot up data locations in the first logical storage unit;
    booting up the computer system using the boot up data that was copied into the first logical storage unit from the second logical storage unit,
    unsetting the recovery bit after the computer system has been booted up.

2. A method for recovering boot up data as recited in claim 1, wherein setting the recovery bit includes receiving input to start recovery of the boot up data.

3. A method for recovering boot up data as recited in claim 1, wherein the copying of the boot up data from the first logical storage unit to the second logical storage unit is managed by firmware being run in a host adapter.

4. A method for recovering boot up data as recited in claim 1, wherein the second logical storage unit is an operating system secure sector.

5. A method for recovering boot up data as recited in claim 1, wherein the second logical storage unit is at least a portion of at least one disk drive.

6. A method for recovering boot up data as recited in claim 1, wherein the boot data includes at least a master boot record and system files.

7. A method for recovering boot up data as recited in claim 1, wherein the first logical storage unit is accessible through firmware on a host adapter.

8. A method for recovering boot up data as recited in claim 1, wherein the first logical unit is at least a portion of at least one storage device.

9. A method for recovering boot up data comprising:
    generating a first logical storage unit, the first logical storage unit being configured to be accessible by an operating system;
    generating a second logical storage unit, the second logical storage unit being configured to be inaccessible by the operating system;
    storing boot up data in the first logical storage unit; and
    determining the location of the boot up data as stored in firmware within a host adapter and copying the boot up data from the first logical storage unit to the second logical storage unit.

10. A method for recovering boot up data as recited in claim 9, wherein the second logical storage unit is an operating system secure sector.

11. A method for recovering boot up data as recited in claim 9, wherein the second logical storage unit is at least a portion of at least one disk drive.

12. A method for recovering boot up data as recited in claim 9, wherein the boot data includes at least a master boot record and system files.

13. A method for recovering boot up data as recited in claim 9, wherein the first logical storage unit is accessible through firmware on a host adapter.

14. A method for recovering boot up data as recited in claim 9, wherein the first logical unit is at least a portion of at least one storage device.

15. A method for recovering boot up data as recited in claim 9, wherein the copying is the boot up data from the first logical storage unit done by a firmware on a host adapter.

* * * * *